US011248976B2

(12) United States Patent
Besling et al.

(10) Patent No.: US 11,248,976 B2
(45) Date of Patent: Feb. 15, 2022

(54) CAPACITIVE PRESSURE SENSORS AND OTHER DEVICES HAVING A SUSPENDED MEMBRANE AND HAVING ROUNDED CORNERS AT AN ANCHOR EDGE

(71) Applicant: Sciosense B.V., AE Eindhoven (NL)

(72) Inventors: Willem Frederik Adrianus Besling, JN Eindhoven (NL); Casper Van Der Avoort, TG Waalre (NL); Remco Henricus Wilhelmus Pijnenburg, Hoogeloon (NL); Olaf Wunnicke, Eindhoven (NL); Jörg Siegert, Graz (AT); Alessandro Faes, Premstätten (AT)

(73) Assignee: SCIOSENSE B.V., AE Eindhoven (NL)

( * ) Notice: Subject to any disclaimer, the term of this patent is extended or adjusted under 35 U.S.C. 154(b) by 0 days.

(21) Appl. No.: 16/758,680

(22) PCT Filed: Nov. 16, 2018

(86) PCT No.: PCT/EP2018/081562
§ 371 (c)(1),
(2) Date: Apr. 23, 2020

(87) PCT Pub. No.: WO2019/096995
PCT Pub. Date: May 23, 2019

(65) Prior Publication Data
US 2020/0348198 A1 Nov. 5, 2020

Related U.S. Application Data

(60) Provisional application No. 62/587,508, filed on Nov. 17, 2017.

(51) Int. Cl.
| *G01L 9/00* | (2006.01) |
| *G01L 9/12* | (2006.01) |
| *G01L 19/00* | (2006.01) |

(52) U.S. Cl.
CPC ............ *G01L 9/0073* (2013.01); *G01L 9/005* (2013.01); *G01L 9/12* (2013.01); *G01L 19/0061* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

| 8,104,354 B2 | 1/2012 | Hsu et al. |
| 8,163,586 B2 * | 4/2012 | Rey ..................... B81C 1/00158 |
| | | 438/53 |

(Continued)

FOREIGN PATENT DOCUMENTS

| CN | 1058298 A | 1/1992 |
| CN | 101094540 A | 12/2007 |

(Continued)

OTHER PUBLICATIONS

Zhang L., "Study on MEMS Processing Method and Technology," A Thesis for the Master Degree of Engineering, Shenyang Ligong University, Dec. 2012, 79 pages.

*Primary Examiner* — Andre J Allen
(74) *Attorney, Agent, or Firm* — Slater Matsil, LLP (57) ABSTRACT

Capacitive pressure sensors and other devices are disclosed. In an embodiment a semiconductor device includes a first electrode, a cavity over the first electrode and a second electrode including a suspended membrane over the cavity and electrically conductive anchor trenches laterally surrounding the cavity, wherein the anchor trenches include an inner anchor trench and an outer anchor trench, the outer anchor trench having rounded corners.

24 Claims, 9 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; H01L 2224/48091; H01L 2924/00014; H01L 2224/48137; H01L 2224/48145; H01L 2224/73265; H01L 2924/00012; H01L 2224/04105; H01L 2224/24137; H01L 2224/49175; H01L 24/19; H01L 2924/1461; H01L 2924/1815; H01L 2924/18162; H01L 29/84; H01L 41/047; H01L 41/0475; H01L 41/1132
USPC .................................................. 73/700–756
See application file for complete search history.

(56) References Cited

U.S. PATENT DOCUMENTS

| | | | |
|---|---|---|---|
| 8,344,466 | B2 | 1/2013 | Corona et al. |
| 8,966,996 | B2 | 3/2015 | Okada et al. |
| 9,340,412 | B2 * | 5/2016 | Besling ............... G01L 9/0073 |
| 9,383,282 | B2 | 7/2016 | Besling et al. |
| 9,513,184 | B2 | 12/2016 | Goossens et al. |
| 9,611,135 | B1 | 4/2017 | Klein |
| 9,638,594 | B2 | 5/2017 | Sakano |
| 10,322,481 | B2 | 6/2019 | Dehe et al. |
| 10,375,481 | B2 | 8/2019 | Jenkins et al. |
| 2006/0022215 | A1 * | 2/2006 | Arndt .................... H01L 33/52 257/99 |
| 2007/0249082 | A1 | 10/2007 | Hanaoka et al. |
| 2014/0319585 | A1 | 10/2014 | Sato |
| 2014/0353773 | A1 | 12/2014 | Loh et al. |
| 2015/0274505 | A1 | 10/2015 | Molfese et al. |
| 2016/0023893 | A1 | 1/2016 | Besling et al. |
| 2017/0016790 | A1 | 1/2017 | Van Der Wiel |
| 2020/0340875 | A1 * | 10/2020 | Besling ............... G01L 9/0073 |

FOREIGN PATENT DOCUMENTS

| | | |
|---|---|---|
| CN | 102056062 A | 5/2011 |
| CN | 102375332 A | 3/2012 |
| CN | 102574676 A | 7/2012 |
| CN | 102768093 A | 11/2012 |
| CN | 103257005 A | 8/2013 |
| CN | 103430000 A | 12/2013 |
| CN | 104422549 A | 3/2015 |
| CN | 104902408 A | 9/2015 |
| CN | 105009604 A | 10/2015 |
| CN | 105181187 A | 12/2015 |
| CN | 105293422 A | 2/2016 |
| CN | 105466611 A | 4/2016 |
| CN | 106353027 A | 1/2017 |
| DE | 102013217318 A1 | 3/2015 |
| TW | 201123927 A | 7/2011 |

* cited by examiner

CAPACITIVE PRESSURE SENSORS AND OTHER DEVICES HAVING A SUSPENDED MEMBRANE AND HAVING ROUNDED CORNERS AT AN ANCHOR EDGE

This patent application is a national phase filing under section 371 of PCT/EP2018/081562, filed Nov. 16, 2018, which claims the priority of U.S. patent No. 62/587,508, filed Nov. 17, 2017, each of which is incorporated herein by reference in its entirety.

TECHNICAL FIELD

The present disclosure relates to capacitive pressure sensors and other devices having a suspended membrane and having rounded corners at an anchor edge.

BACKGROUND

Pressure sensors, such as microelectromechanical systems (MEMS) sensors, have many applications. These sensors can be used, for example, in automotive, consumer, industrial, medical, and other applications. In MEMS sensors, for example, pressure can be measured via deflection of a membrane caused by an external pressure. Large deflections or temperature differences, however, can induce significant non-linearity in the sensors, which may present challenges in a variety of applications. Accurate and repeatable manufacturing processes of membranes and pressure sensors can allow for more accurate pressure readings over a range of temperatures and pressures.

Some capacitive pressure sensors include a tungsten membrane. Tungsten films, however, are known to have a high tensile stress, which can lead to in cracks and fractured membranes. Accordingly, improved techniques and structures that can reduce the stress and help avoid damage to the membranes are desirable.

SUMMARY

Embodiments provide techniques and structures that can reduce the stress and help avoid damage to a suspended membrane of a capacitive pressure sensor or other device.

For example, in one aspect, the present disclosure describes a semiconductor device that includes a first electrode, a cavity over the first electrode, and a second electrode including a suspended membrane over the cavity. The second electrode further includes electrically conductive anchor trenches laterally surrounding the cavity. The anchor trenches include an inner anchor trench and an outer anchor trench, wherein the outer anchor trench has rounded corners.

In another aspect, the disclosure describes a semiconductor device that includes an integrated circuit, and a capacitive pressure sensor disposed over and electrically connected to the integrated circuit. The capacitive pressure sensor includes a first electrode, a cavity over the first electrode, and a second electrode including a suspended membrane over the cavity. The second electrode further includes electrically conductive anchor trenches laterally surrounding the cavity. The anchor trenches include an inner anchor trench and an outer anchor trench, wherein the outer anchor trench has rounded corners.

Some implementations include one or more of the following features. For example, in some instances, the rounded corners of the outer anchor trench have a radius of at least 40 pm. In some implementations, the rounded corners may have a smaller radius. In some cases, the inner anchor trench also has rounded corners; however, the rounded corners of the outer anchor trench can have a radius at least twice as large as a radius of the rounded corners of the inner anchor trench. In some implementations, the electrically conductive anchor trenches further include one or more intermediate anchor trenches disposed between the inner and outer anchor trenches. The one or more intermediate anchor trenches also can have rounded corners. An oxide support layer can separate adjacent ones of the electrically conductive anchor trenches from one another. In some cases, the membrane has a rectangular shape. In other instances, each of the membrane and the anchor trenches has a non-rectangular shape.

Some implementations include one or more of the following advantages. For example, the devices described here, including the incorporation of rounded corners for the outer anchor trench(es), can mitigate the formation of micro cracks in an underlying etch stop layer at the corners of the trenches that form part of the membrane support, thereby avoiding reliability problems and reducing the risk of membrane fracture.

The structures described here can be particularly advantageous for tungsten membranes in which local stress concentrations should be avoided. Such stresses otherwise may result in anchor delamination, anchor under-etching, and/or membrane failure.

BRIEF DESCRIPTION OF THE DRAWINGS

Other aspects, features and advantages will be readily apparent form the following detailed description, the accompanying drawings and the claims.

DETAILED DESCRIPTION OF ILLUSTRATIVE EMBODIMENTS

Figure 1A:
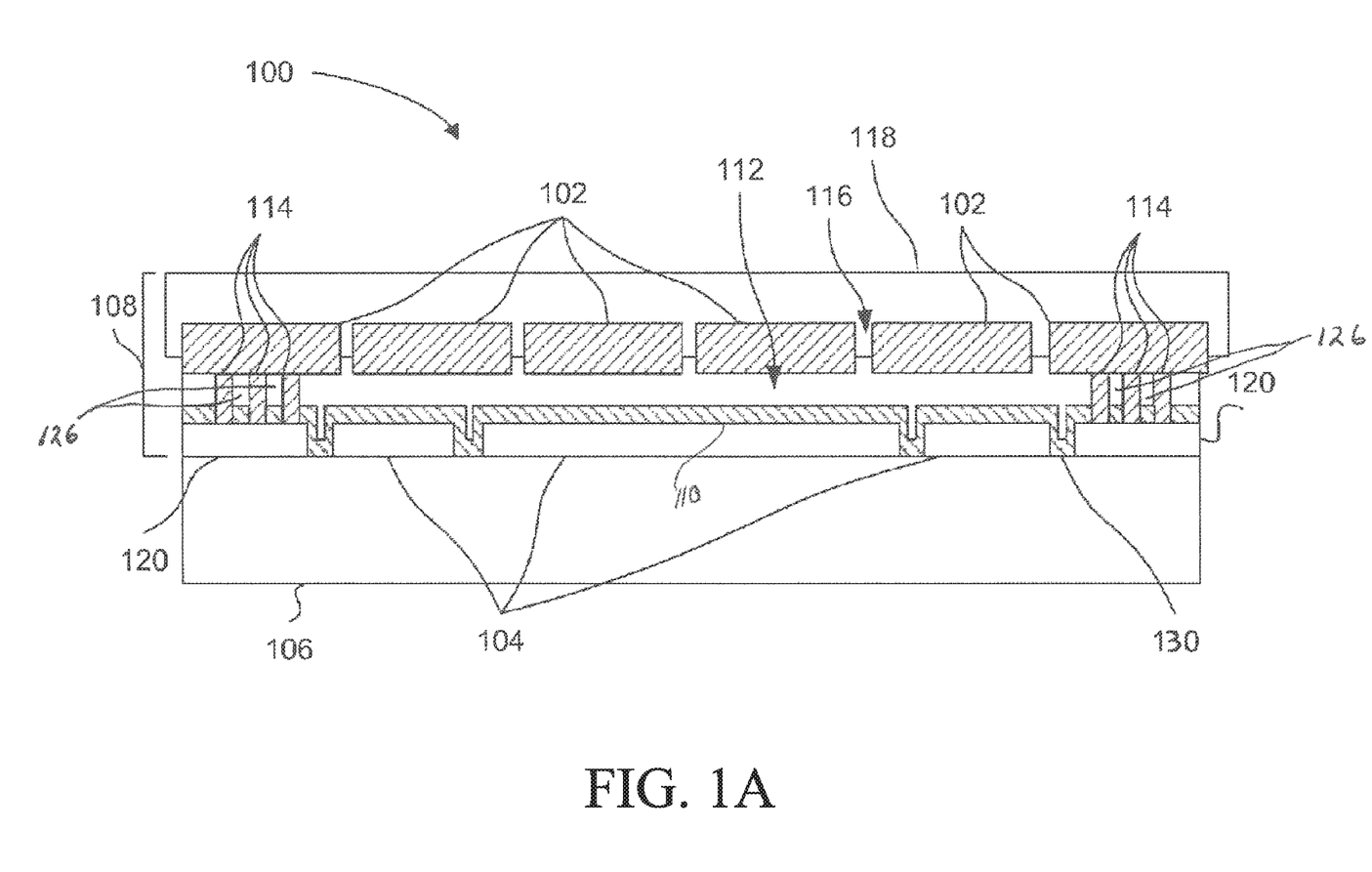
FIG. 1A depicts a cut-away view of an embodiment of a suspended membrane of a semiconductor device.

As shown in FIG. 1A, a semiconductor device 100 includes a capacitive pressure sensor 108 formed over an integrated circuit 106. The capacitive pressure sensor 108 includes a suspended tensile membrane 102 over a cavity 112. The sensor 108 also can include a bottom electrode 104, which in some implementations is formed on top of the final passivation layer of a CMOS read-out circuit. The electrode(s) and suspended membrane of the capacitive pressure sensor 108 can be connected electrically to the integrated circuit 106. The bottom electrode 104 may be segmented and may include multiple annular rings.

Two or more anchor trenches 114 laterally surround the cavity 112, are filled with a first electrically conductive material, and are separated from one another by an oxide support layer (e.g., silicon oxide) 126. The first electrically conductive material that fills the anchor trenches 114 can include, for example, a physical vapor deposition (PVD) Ti/TiN liner and chemical vapor deposition (CVD) tungsten (W). The cavity 112 sidewalls are formed, at least in part, by the conductive material of the inner anchor trench 114A. The suspended membrane 102 can be composed of a second electrically conductive material (e.g., tungsten (W)) and extends beyond the outer anchor trench 114B. The first electrically conductive material 114 thus serves as supporting anchors for the suspended membrane 102. The first electrically conductive material 114 and the membrane 102 form part of a top electrode that is suspended above the bottom electrode 104. The cavity 112 separates the membrane 102 and bottom electrode 104 from one another. An isolation trench 130 can separate the bottom electrode from connections 120 for the top electrode.

Although various materials can be used for the membrane 102, the use of tungsten (W) for the membrane can be advantageous. For example, CVD W is readily available in standard CMOS fabrication facilities for via fill applications, W has a low CTE mismatch with silicon which can help reduce the temperature sensitivity of the transducer, W has high tensile stress which can help avoid membrane buckling during seal deposition, W is not etched by vapor HF during processing (i.e., membrane release), W is a refractory material that does not show stress change at elevated temperatures. This latter feature can help provide stable membrane compliance and sensor performance over time.

In some implementations, the membrane 102 has a rectangular (e.g., square) shape. This feature can be important for some implementations because a sensor having a rectangular membrane can be modelled more accurately using a physical deflection model, while also making more efficient use of area than a circular device. The ability to model the device accurately can be advantageous for calibration, which typically relies on an accurate description of the deflection behavior of the membrane. For rectangular membranes, however, the stress around the perimeter of the membrane may not be constant. For example, for square membranes, the highest lateral stress generally is encountered at the edge halfway along the edge length. Thus, it can be beneficial to reduce local stress build up induced by the highly tensile tungsten membrane 102.

Figure 1B:
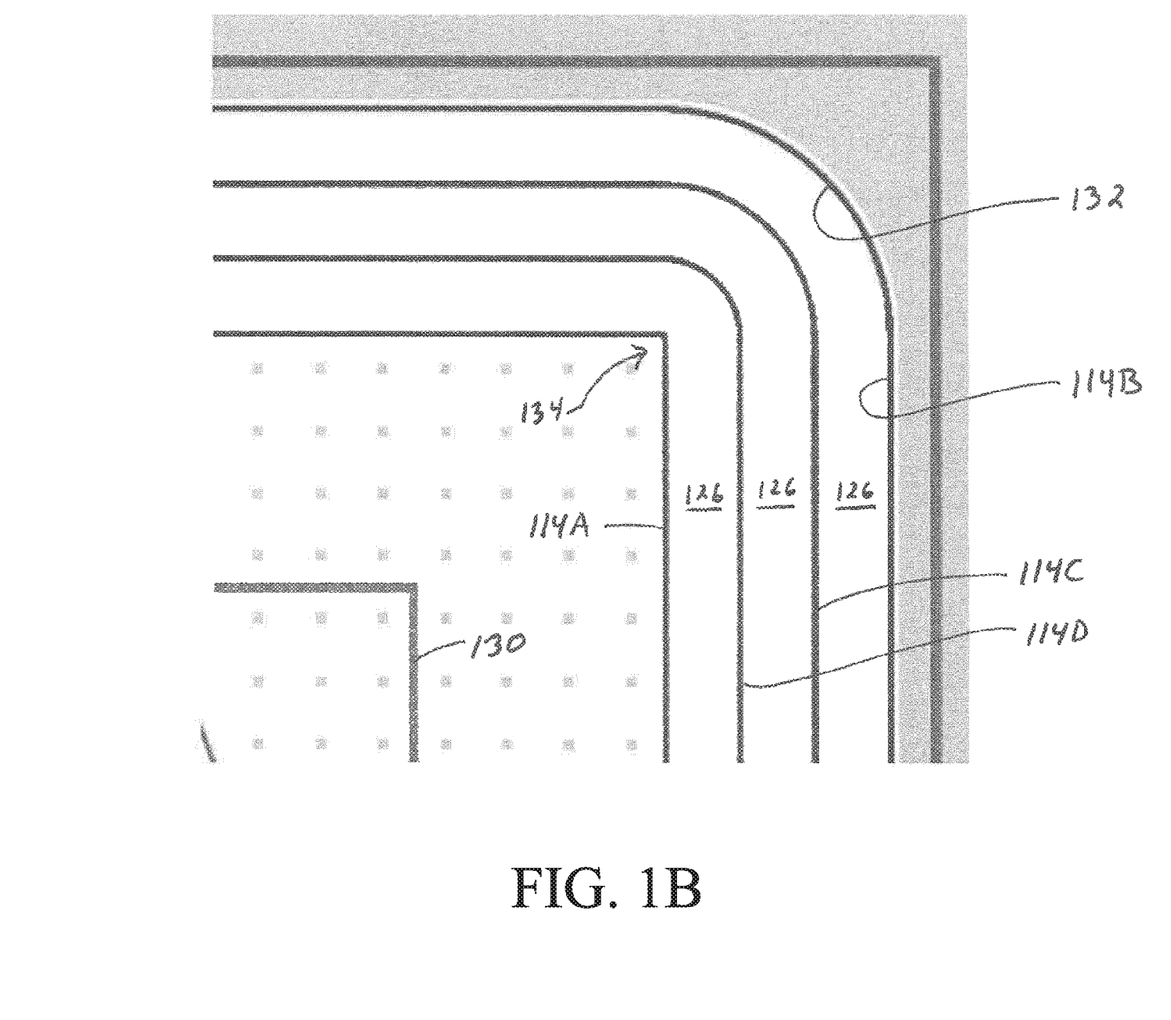
FIG. 1B depicts a top view showing an example of outer anchor trenches having rounded corners.

To help reduce the stress, the outer anchor trench 114B, which can have an overall shape that is generally rectangular, has rounded corners 132 at its outer edges, as shown, for example, in FIG. 1B. The corners 134 of the inner anchor trench 114A, however, need not be rounded, because the local tensile stress are relatively low at those locations. Instead, the edges forming the corners 134 of the inner anchor trench 114A can be only slightly rounded or may be relatively straight so as to form close to a 90° angle. One reason for the foregoing difference between the inner and outer anchor trenches is that the innermost anchor trench 114A determines the deflection behavior of the membrane 102, whereas the outer anchor trench 114B primarily impacts the stress. The rounded corners 132 of the outer anchor trench 114B can help reduce the stress.

Some implementations include a single outer anchor trench 114B and a single inner anchor trench 114A with the oxide support layer 126 in between. In some cases, however, it can be beneficial to add one or more intermediate anchor trenches 114C, 114D between the innermost and outermost anchor trenches 114A, 114B. The additional anchor trenches can be advantageous, for example, in helping avoid dishing during a subsequent chemical mechanical polishing (CMP) step and helping avoid critical failure of the device if one or more of the anchors 114 is partially under-etched. Where there are more than two anchor trenches 114, the corners of all the outer anchor trenches (i.e., the outermost anchor trench 114A and intermediate anchor trenches 114C, 114D) preferably are rounded. As noted above, the anchor trenches are separated from one another by the oxide layer 126.

The inventors of the present application have determined that corner rounding of the outer anchor trench(es) can have a beneficial impact on maximum corner stress. For example, simulations indicate that, for some implementations, the stress drops relatively quickly as the radius of the corners decreases from about 5 pm to 25 pm. Thus, in some cases, the corners of the outer anchor trench(es) are rounded and have a radius of at least 5 pm, at least 10 pm, at least 15 pm, at least 20 pm or at least 25 pm. Further, in some instances, if the radius of the corner(s) of the outer anchor trench(es) is at least 40 um, the stress can be reduced by more than a factor of 2. Thus, in some implementations, it is advantageous to provide the outer anchor trench(es) with rounded corners having a radius of 40 pm or more.

Although it generally is not necessary for the innermost anchor trench 114A to have rounded corners, it too may have slightly rounded corners in some cases. Nevertheless, even in such cases, it can be advantageous for the outer anchor trench(es) to have rounded corners having a radius that is at least twice as large as the radius of the rounded corners of the innermost anchor trench. For example, if the innermost anchor trench 114A has rounded corners having a radius of about 9 pm, the outer anchor trenches (e.g., 114B) preferably have rounded corners having a radius of at least 18 pm.

In some implementations, the first electrically conductive material that fills the anchor trenches is PVD Ti/TiN and CVD W. Other materials can be used in some implementations. In some cases, the anchor trenches have a width in the range of 0.5 um-0.8 um. Other widths may be appropriate for some implementations. In some instances, the distance between adjacent anchor trenches 114 is 4-5 um. Too large a distance may result in dishing of the oxide 126 between the trenches 114. If a distance of 4-5 um is present between the adjacent ancho trenches 114, the radii of the intermediate anchor trenches should increase gradually as one moves from an inner trench to the most outer trench. In some cases, to have a more or less uniform distance between the anchor trenches 114, there should be at least four trenches 114, so to achieve a corner rounding of 40 um for the outermost trench 114B.

As further shown in FIG. 1A, the illustrated semiconductor device 100 includes an isolation layer 110, which also can serve as an etch stop layer. During device fabrication, a sacrificial oxide layer can be etched to create the cavity 112 above the bottom electrode 104. During the etching, the isolation layer no covers and protects the bottom electrode 104. The suspended membrane 102 can include etch openings 116 through which the sacrificial layer can be etched and removed, thereby creating the cavity 112. After removing the sacrificial layer, a sealing layer 118 can be provided to seal the cavity 112 by sealing the etch openings 116. In some implementations, another advantage of using a rectangular-shaped membrane 102 is the uniform placement of the etch release holes 116 with respect to each other and with respect to the distance to the membrane anchors 114. If the rectangular membrane 102 and corners of the inner anchor trench 114A were rounded, the distance of the sacrificial etch holes 116 to the edge would vary. This variation could induce local changes in stress which, in turn, could induce membrane cracking during removal of the sacrificial oxide.

The semiconductor device 100 of FIG. 1A also depicts electrically conductive connections 120 to connect the top electrode or the membrane 102 to the integrated circuit 106 or elsewhere. The semiconductor device 100 also may include aluminum or other contact pads to provide connections to another device. Various vias may extend down from the contact pads to the bottom electrode, and also from the bottom electrode to the CMOS top metal layer.

For capacitive read-out, bond wires between an ASIC die and the MEMS die generally are not desirable because they produce noise. Using tungsten membrane technology permits manufacture of the pressure sensitive membrane on top of the passivation layer of the CMOS readout circuit. Thus, the present technique provides for monolithic integration in which a pressure transducer with read-out circuitry is integrated in a single die. Further, the membrane manufacturing approach can be implemented at relatively low cost because only several (e.g., 4-5) extra mask steps are needed to construct a capacitive pressure sensor on top of a CMOS read-out circuit. Thus, the resulting techniques not only can reduce the device's footprint and thus manufacturing cost, but also can improve noise performance because of the integration of the sensor on the chip and the avoidance of external wire bonds.

FIGS. 2 and 3A-3I depict various stages in the fabrication of a semiconductor device 100 of FIG. 1A. Although the semiconductor devices 200 and 300 of FIGS. 2 and 3A-3I are shown and described with certain components and functionality and certain fabrication steps, other implementations may include fewer or more components or steps to implement more or less functionality.

Figure 2:
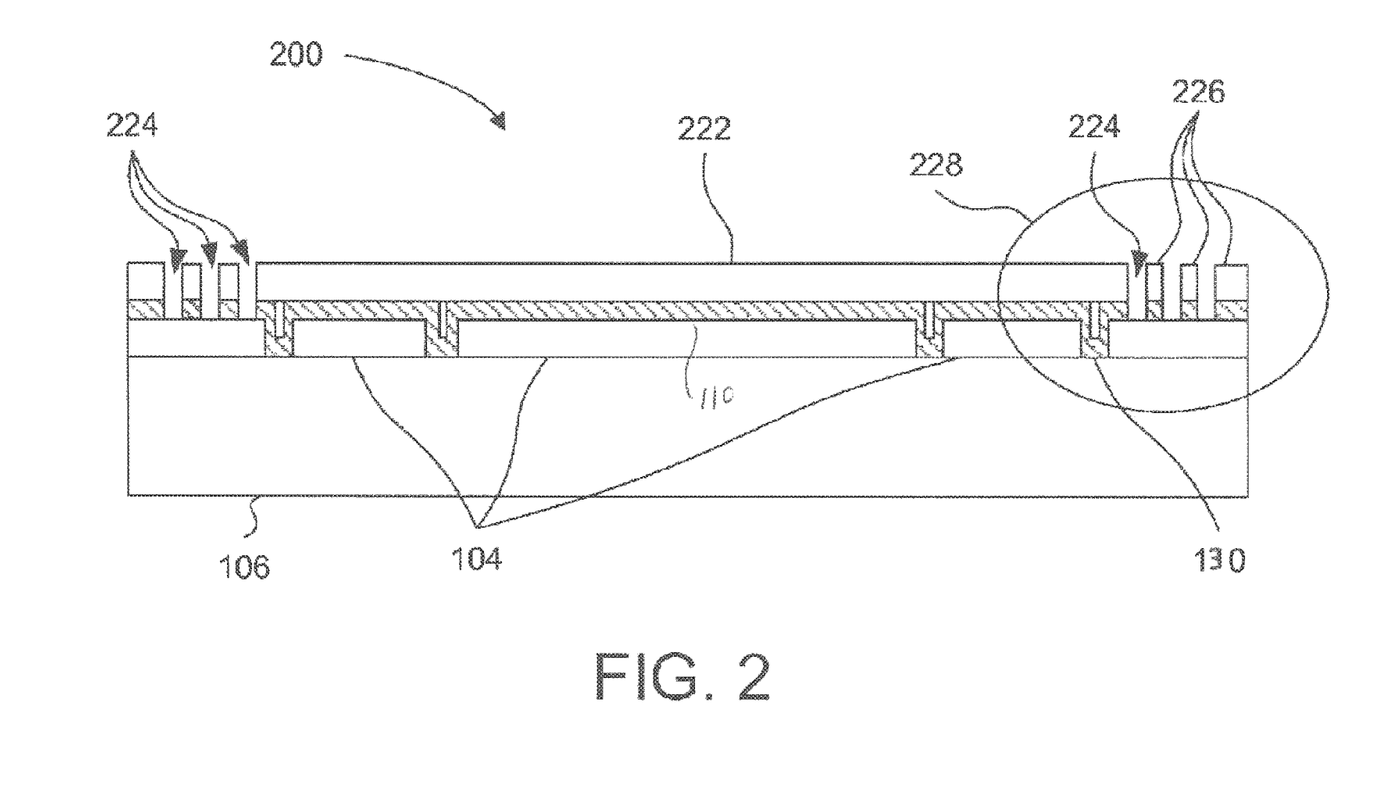
FIG. 2 depicts a cut-away view of an embodiment of a semiconductor device after depositing a sacrificial layer.

As shown in FIG. 2, the semiconductor device 200 depicts a bottom electrode 204 and an isolation layer/etch stop 210 already formed above an integrated circuit 206. In addition, a sacrificial layer 222 is formed above the bottom electrode 204. The illustrated semiconductor device 100 also includes additional oxide 226 separated from the sacrificial layer 222 by boundary trenches 224. The illustrated implementation includes three boundary trenches 224 on each side of the sacrificial layer 222. In some implementation, there may be a different number of boundary trenches 224. The boundary trenches 224 preferably completely encircle the perimeter of the sacrificial layer 222. The innermost boundary trench serves to define the length and width of the suspended membrane. Thus, for a rectangular membrane, the innermost boundary trench (i.e., the one closest to the sacrificial layer 222) can be rectangular-shaped with either square or slightly rounded corners. The other boundary trenches, including the outermost boundary trench (i.e., the one furthest from the sacrificial layer 222), also may be rectangular-shaped, but with rounded corners, as discussed above.

In FIG. 2, a part of the semiconductor device 200 is indicated by a circle 228. FIGS. 3A through 3I focus on this portion of a semiconductor device (indicated by 300 in FIGS. 3A-3I.

The isolation layer/etch stop 210 can be provided to prevent shorts between a top electrode and the bottom electrode 204, as well as to avoid etching of an underlying passivation layer. The isolation layer/etch stop 210 may be composed, for example, of SiN (including a silicon rich SiN), SiC, and/or Al2O3, or a combination thereof, or another suitable material to prevent shorts and avoid etching. Some implementations may differ and utilize separate components to effectuate the functions of the isolation layer/etch stop 210. In some implementations, an etch stop layer is formed below the bottom electrode 204. To prevent shorts between the bottom electrode 204 and the top electrode, an isolation layer or anti-shorting layer can be formed on top of the bottom electrode 204. In some implementations, an isolation layer is provided on top of the sacrificial layer 222. In some implementations, there is an isolation layer below and above the sacrificial layer 222. One of the layers can be patterned to provide anti-stiction bumps. In addition, the presence of a layer above the sacrificial layer may become a support layer for the top electrode or membrane so as to avoid buckling.

Figure 3A:
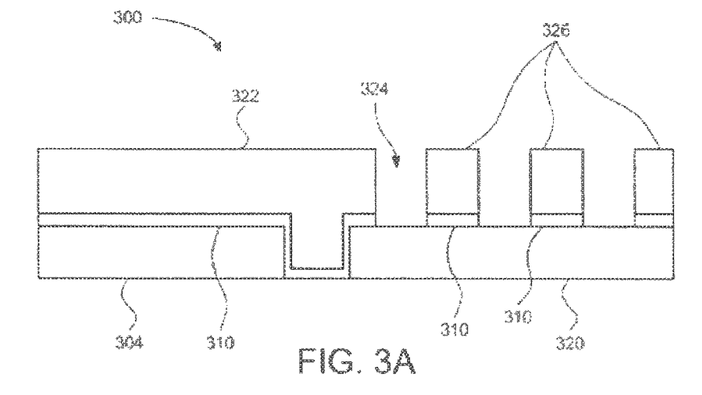
FIGS. 3A-3I depict parts of the semiconductor device of FIG. 2 during subsequent processing steps.

As shown in FIG. 3A, the semiconductor device 300 includes a bottom electrode 304, an isolation layer (and/or etch stop layer) 310, connectors 320, a sacrificial layer 322, and additional material 326 (e.g., S102) to help form the boundary trenches 324. The inner boundary trench 324 defines the sidewall boundary of the sacrificial layer 322. The isolation layer 310 can isolate the bottom electrode 304 from the top electrode or suspended membrane in the event the suspended membrane collapses or otherwise comes in contact with the bottom electrode 304. Additionally, the isolation layer 310 can serve as an etch stop to protect the bottom electrode 304 during subsequent etching of the sacrificial layer 322.

Figure 3B:
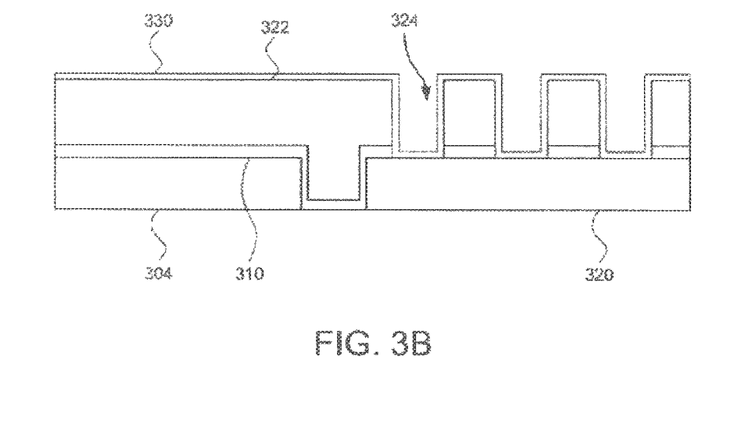

FIG. 3B depicts an example of the semiconductor device of FIG. 3A after depositing an adhesive layer. Some implementations do not utilize the adhesive layer. Nevertheless, the adhesive layer 330 may serve various purposes including improving adhesion to the underlying layer, avoiding etching of the underlying oxide during CVD tungsten deposition, reducing stress on the electrically conductive material, and creating a good ohmic electrical contact to any underlying material. In some implementations, the adhesive layer 330 includes titanium, titanium nitride, or a combination thereof.

Figure 3C:
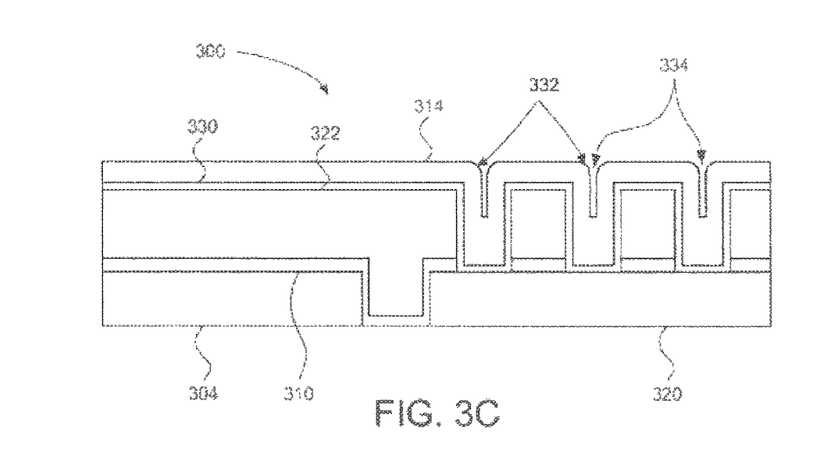

FIG. 3C depicts an example of the semiconductor device 300 of FIG. 3B after conformally depositing a first electrically conductive material 314 above the sacrificial layer 322 and into the sidewall boundary trenches 324. The conformal deposition of the first electrically conductive material 314 deposits a first layer of material above the sacrificial layer 322 and in the boundary trenches 324. The transition of the material 314 from the top of the sacrificial layer 322 to the boundary trench 324 creates a transition portion 332 including a slot or seam 334 located over the boundary trench 324.

Subsequent processing steps are illustrated in FIGS. 3D through 3I, and can include a CMP step to remove at least a portion of the first electrically conductive material 314. The CMP step allows for removal of uneven topography, such as the slot or seam 334 and the corner transition portion 332. By removing the material using CMP, only the topography will be removed, as the material in the boundary trenches 324 will be protected by the sacrificial layer 322 and the portions 326. Next, a second electrically conductive material may be re-deposited above the sacrificial layer 322 and the first electrically conductive material 314 located within the boundary trenches 324. The subsequent depositing of the second layer of material allows for the material to be deposited with substantially flat topography without the slots, seams, and come transition portions. The subsequent deposition also allows for the second electrically conductive material 302 to be deposited beyond the multiple boundary trenches 324, which allows for stress distribution over more than just the innermost boundary trench.

The first electrically conductive material 314 located in the boundary trenches 324 can serve various purposes including as anchors to the subsequently formed suspended membrane, electrical connection paths for the top electrode, and/or as etch stops around the sacrificial layer 322 and subsequently-formed cavity.

Figure 3D:
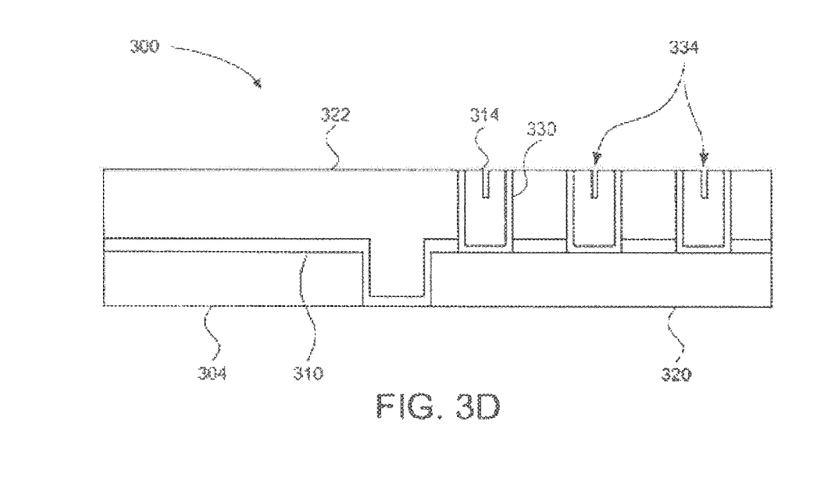

FIG. 3D depicts an implementation of the semiconductor device 300 of FIG. 3C after removing a portion of the first electrically conductive material 314. As shown, a portion of the first electrically conductive material 314 is removed from above the sacrificial layer 322 (a portion of the adhesive layer 330 also is removed). In addition, the corner transition portion 332 above the boundary trenches 324 is removed. A portion of the slot or seam 334 may still be present, but the majority of the topography is now substantially flat and ready for depositing the second electrically conductive material with a substantially flat topography and without any corner portions 332 that may lead to failure. As previously explained, the first electrically conductive material 314 serves as supporting anchors for the second electrically conductive material that is to be deposited as the membrane. In some implementations, the supporting anchors still may include a portion of the seams or slots 334.

In some implementations, removing a portion of the first electrically conductive material 314 is accomplished by CMP, which can allow for the removal of all electrically conductive material outside of the boundary trenches 324. In some implementations, the all the material down to the level of the sacrificial layer 322 is removed. In some implementations, only a portion of the material above the sacrificial layer 322 is removed. In some implementations, only a portion of the corner transition portion 332 is removed. In some implementations, all seams 334 and corner transition portions 332 are completely removed a result of the CMP step.

In some instances, uneven topography and/or corner transition portions may occur at other points in addition to areas above the boundary trenches 324. For example, the bottom electrode 304 may be patterned, resulting in uneven topography of the first electrically conductive material 314 above the sacrificial layer 322. Such uneven topography above the sacrificial layer 322 may be removed as well in the CMP removal step. Failure to remove such uneven topography and corner transitions can result in high localized stress, which in turn may result in damage to the membrane upon suspension.

Figure 3E:
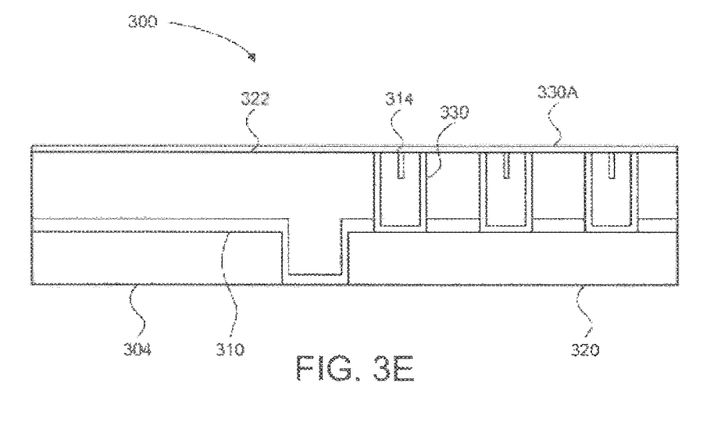

FIG. 3E depicts an implementation of the semiconductor device of FIG. 3D after depositing an adhesive layer 330A. The adhesive layer 330A may be deposited before depositing the second electrically conductive material. The adhesive layer 330A can be, for example, the same material as the previous adhesive layer 330 and may serve some of the same functions as the previous adhesive layer 330. Some implementations do not include the adhesive layer 330A. By removing a portion of the first electrically conductive material 314 and subsequently depositing a second electrically conductive material or second layer of material, deposition of the adhesive layer 330 in the boundary trenches 324 can be decoupled from the subsequent deposition of the adhesive layer 330A as part of the membrane stack. This allows application of a thick adhesive layer as stress compensation for the suspended membrane.

Figure 3F:
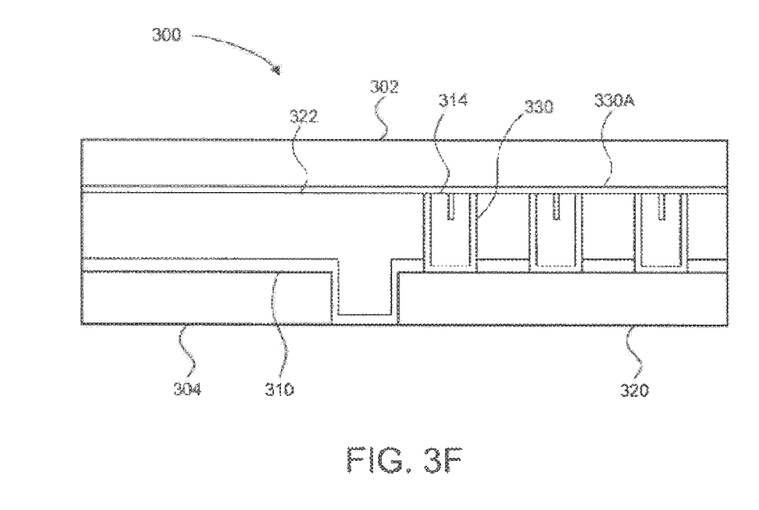

FIG. 3F depicts an implementation of the semiconductor device 300 of FIG. 3E after conformally depositing a second electrically conductive material 302 above the sacrificial layer 322 and extending beyond the first electrically conductive material 314 and the boundary trench 324. The second electrically conductive material 302 can be the same material as the first electrically conductive material 314 or may be a different material (e.g., tungsten). As noted above, the first layer of material 314 serves as anchor/support points for the second layer of material 302. This reduces problematic stress that can occur when only a single layer of material is deposited as the transition from above the sacrificial layer 322 to the boundary trenches 324.

Figure 3G:
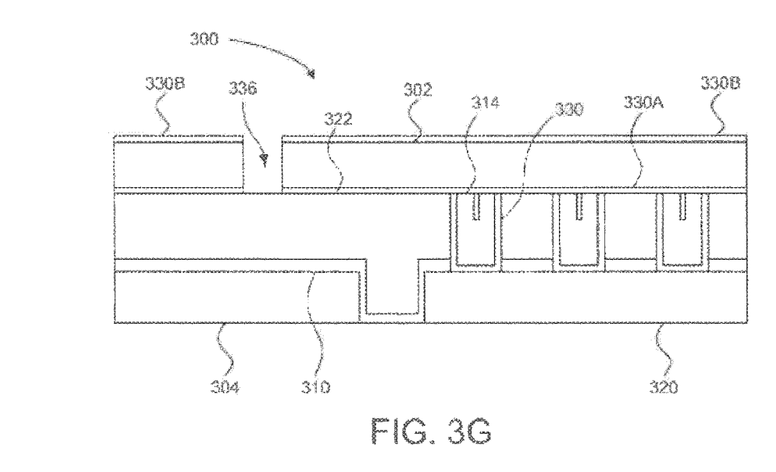

FIG. 3G depicts an implementation of the semiconductor device 300 of FIG. 3F after depositing another adhesive layer 330B above the second electrically conductive material 302 and creating etch openings 336 above the sacrificial layer 322. The adhesive layer 330B can be the same material as the previous adhesive layers 330, 330A and can serve some of the same functions as the previous adhesive layers 330, 330A. Some implementations do not include the adhesive layer 330B. The thickness of the adhesive layer 330B and other adhesive layers may be optimized to reduce the stress of the membrane 302.

Figure 3H:
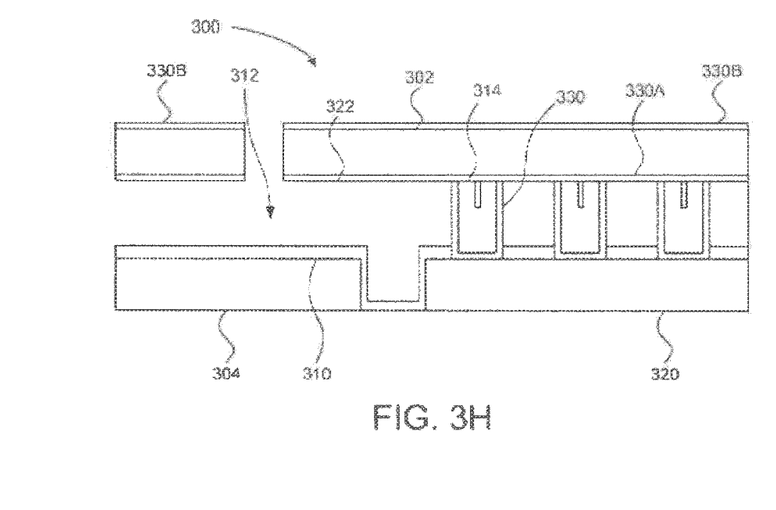

FIG. 3H depicts an implementation of the semiconductor device 300 of FIG. 3G after removing the sacrificial layer 322 and releasing the membrane 302 of the semiconductor device 300. The sacrificial layer 322 can be, for example, an oxide and can be removed by a hydrofluoric (HF) vapor that removes the sacrificial oxide layer 322 without attacking the first electrically conductive material 314. The first electrically conductive material 314 can serve as an etch stop and allow for the accurate creation of a cavity 312. By etching the sacrificial layer 322 to the first electrically conductive material 314, the size and shape of the cavity 312 can be controlled without having to monitor a lateral etching rate. In addition, when it is necessary to control the lateral etching rate, the size of the etch openings 336 may need to be larger, and there may need to be more etch openings 336 on the membrane 302. Reducing the number and size of the etch openings may allow for more structurally sound suspended membranes and can reduce costs and issues during sealing of the cavity 312.

Figure 3I:
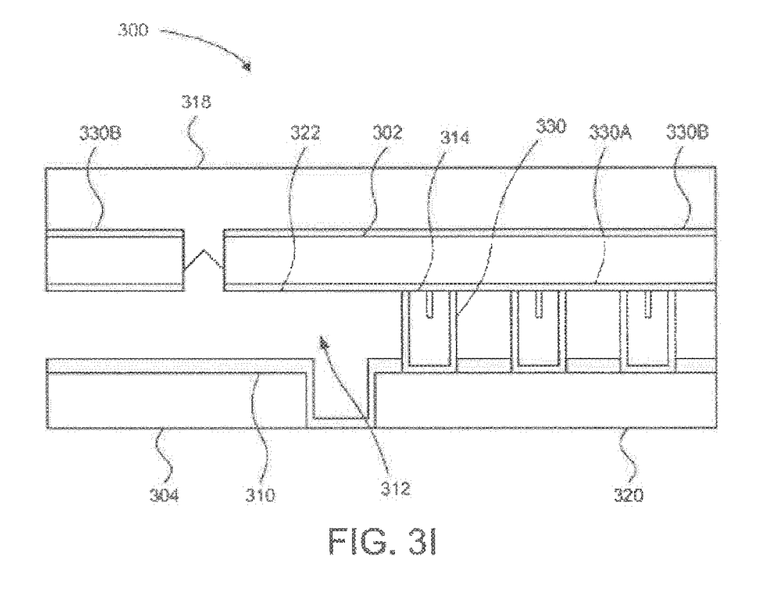

FIG. 3I depicts an implementation of the semiconductor device 300 of FIG. 3H after deposition of a sealing layer 318 above the second electrically conductive material 302 and sealing etch openings 336 above the cavity 312. The etch openings 336 and the cavity 312 may be sealed by a silicon nitride or silicon oxide dielectric film. The sealing layer 318 may be a dielectric sealing layer used to fill partially or completely the etch openings 336. In some embodiments, sealing layer 318 may be a metallic sealing layer used to fill partially or completely the etch openings 336. In some implementations, the membrane 302 may be completely sealed and then subsequently opened again at selected spots to create venting holes. The sealing layer 318 may include, for example, silicon dioxide, silicon nitride, or a stacked combination of these materials. Deposition methods may include, for example, high density plasma oxide (HDP oxide), plasma enhanced chemical vapor deposition (PECVD), physical vapor deposition (PVD), chemical vapor deposition (CVD), and/or atomic layer deposition (ALD).

Other techniques for fabricating the capacitive pressure sensor 108 may be used for some implementations.

Figures 4A, 4B, 4C:
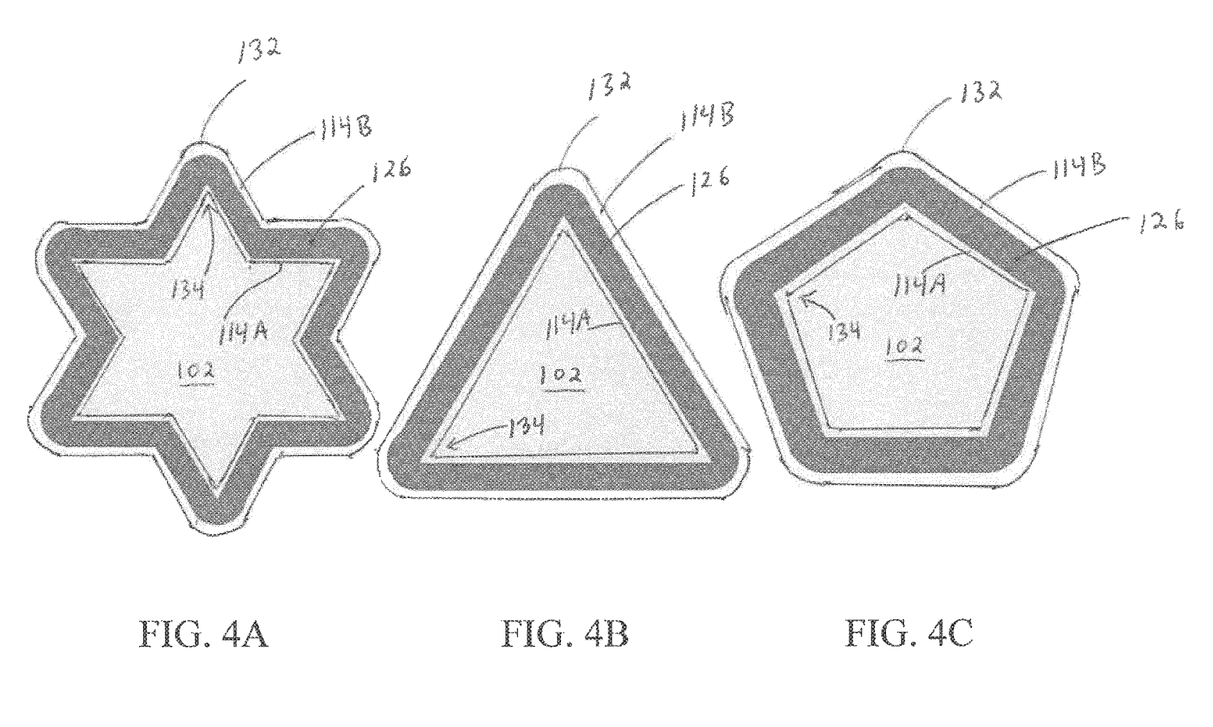
FIGS. 4A-4C illustrate examples of membranes and anchor trenches having non-rectangular shapes.

Although the foregoing examples describe devices having a rectangular membrane 102, the feature of rounded corners for the outer anchor trench(es) also can be applied to other implementations in which the membrane 102 as well as the anchor trenches 114 have a non-rectangular shape. Examples are illustrated in FIGS. 4A, 4B and 4C. In each example, the inner and outer anchor trenches 114A, 114B can have an overall shape that is similar to the shape of the membrane 102. However, the outer anchor trench 114A has rounded corners 132. The inner anchor trench 114A need not have rounded corners (although, in some cases, it may have rounded corners too). As explained above, some implementations may include one or more additional anchor trenches between the innermost and outermost anchor trenches 114A, 114B. Preferably the corners of any anchor trenches between the innermost and outermost anchor trenches 114A, 114B are rounded as well. Adjacent anchor trenches are separated from one another by an oxide support layer 126.

The foregoing membrane technology can be applied not only for the fabrication of capacitive pressure sensors on CMOS circuits, but also for ultrasound transducers, microphones, speakers, micro hot plates, IR detectors and other devices that include a capacitive pressure sensor.

In the foregoing description, specific details of various implementations are provided. However, some implementations may be practiced with fewer than all of these specific details. Likewise, some implementations may include additional features. Accordingly, other implementations are within the scope of the claims.

The invention claimed is:

1. A semiconductor device comprising:
    a first electrode;
    a cavity over the first electrode; and
    a second electrode comprising:
        a suspended membrane over the cavity; and
        electrically conductive anchor trenches laterally surrounding the cavity,
            wherein the anchor trenches include an inner anchor trench and an outer anchor trench, the outer anchor trench having rounded corners.

2. The semiconductor device of claim 1, wherein the rounded corners of the outer anchor trench have a radius of at least 40 pm.

3. The semiconductor device of claim 1, wherein the inner anchor trench has right-angles corners.

4. The semiconductor device of claim 1, wherein the inner anchor trench has rounded corners, and wherein the rounded corners of the outer anchor trench have a radius at least twice as large as a radius of the rounded corners of the inner anchor trench.

5. The semiconductor device of claim 1, wherein the rounded corners of the outer anchor trench have a radius of at least 5 pm.

6. The semiconductor device of claim 1, wherein the electrically conductive anchor trenches further include one or more intermediate anchor trenches disposed between the inner and outer anchor trenches.

7. The semiconductor device of claim 6, wherein one or more of the intermediate anchor trenches has rounded corners.

8. The semiconductor device of claim 7, wherein an oxide support layer separates adjacent ones of the electrically conductive anchor trenches from one another.

9. The semiconductor device of claim 1, wherein the suspended membrane has a rectangular shape.

10. The semiconductor device of claim 1, wherein each of the suspended membrane and the anchor trenches has a non-rectangular shape.

11. The semiconductor device of claim 1, wherein the suspended membrane is composed of tungsten.

12. A semiconductor device comprising:
    an integrated circuit; and
    a capacitive pressure sensor disposed over and electrically connected to the integrated circuit, the capacitive pressure sensor comprising:
        a first electrode;
        a cavity over the first electrode; and
        a second electrode comprising:
            a suspended membrane over the cavity; and
            electrically conductive anchor trenches laterally surrounding the cavity,
                wherein the anchor trenches include an inner anchor trench and an outer anchor trench, the outer anchor trench having rounded corners.

13. The semiconductor device of claim 12, wherein the rounded corners of the outer anchor trench have a radius of at least 40 pm.

14. The semiconductor device of claim 12, wherein the inner anchor trench has substantially right-angles corners.

15. The semiconductor device of claim 12, wherein the inner anchor trench has rounded corners, and wherein the rounded corners of the outer anchor trench have a radius at least twice as large as a radius of the rounded corners of the inner anchor trench.

16. The semiconductor device of claim 12, wherein the rounded corners of the outer anchor trench have a radius of at least 5 pm.

17. The semiconductor device of claim 12, wherein the electrically conductive anchor trenches further include one or more intermediate anchor trenches disposed between the inner and outer anchor trenches.

18. The semiconductor device of claim 17, wherein one or more of the intermediate anchor trenches has rounded corners.

19. The semiconductor device of claim 18, wherein an oxide support layer separates adjacent ones of the electrically conductive anchor trenches from one another.

20. The semiconductor device of claim 12, wherein the suspended membrane has a rectangular shape.

21. The semiconductor device of claim 12, wherein each of the suspended membrane and the anchor trenches has a non-rectangular shape.

22. The semiconductor device of claim 12, wherein the integrated circuit includes a CMOS read-out circuit.

23. The semiconductor device of claim 22, wherein the CMOS read-out circuit includes a passivation layer, and wherein the capacitive pressure sensor is disposed on the passivation layer.

24. The semiconductor device of claim 12, wherein the suspended membrane is composed of tungsten.

* * * * *

UNITED STATES PATENT AND TRADEMARK OFFICE
CERTIFICATE OF CORRECTION

PATENT NO. : 11,248,976 B2  
APPLICATION NO. : 16/758680  
DATED : February 15, 2022  
INVENTOR(S) : Besling et al.

Page 1 of 1

It is certified that error appears in the above-identified patent and that said Letters Patent is hereby corrected as shown below:

In the Claims

Claim 2, Column 9, Line 25; delete "40 pm" and insert --40 µm--.

Claim 5, Column 9, Line 35; delete "40 pm" and insert --40 µm--.

Claim 13, Column 10, Line 17; delete "40 pm" and insert --40 µm--.

Claim 14, Column 10, Line 19; delete "substantially" in between "has" and "right-angles".

Claim 16, Column 10, Line 27; delete "40 pm" and insert --40 µm--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*